(12) United States Patent
Qiu et al.

(10) Patent No.: US 11,640,658 B2
(45) Date of Patent: May 2, 2023

(54) MULTI-PATH IMAGE PROCESSING APPARATUS AND METHOD

(71) Applicant: REALTEK SEMICONDUCTOR CORPORATION, Hsinchu (TW)

(72) Inventors: Qing-Zhe Qiu, Suzhou (CN); Dong-Yu He, Suzhou (CN); Shao-Hua Jin, Suzhou (CN); Hong-Hai Dai, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 320 days.

(21) Appl. No.: 17/131,827

(22) Filed: Dec. 23, 2020

(65) Prior Publication Data
US 2022/0005167 A1 Jan. 6, 2022

(30) Foreign Application Priority Data
Jul. 6, 2020 (CN) .......................... 202010642096.7

(51) Int. Cl.
*G06T 5/50* (2006.01)
*G06T 7/11* (2017.01)
*H04N 5/232* (2006.01)
*H04N 5/247* (2006.01)

(52) U.S. Cl.
CPC .................. *G06T 5/50* (2013.01); *G06T 7/11* (2017.01); *H04N 5/23229* (2013.01); *H04N 5/247* (2013.01); *G06T 2207/20221* (2013.01)

(58) Field of Classification Search
CPC ... G06T 5/50; G06T 7/11; G06T 2207/20221; G06T 1/60; G06T 1/20; G06T 7/10; H04N 5/23229; H04N 5/247; H04N 5/265; H04N 21/4302
USPC ........................................................ 382/173
See application file for complete search history.

(56) References Cited

U.S. PATENT DOCUMENTS

| 4,949,391 A * | 8/1990 | Faulkerson ............ H04N 1/107 |
| | | 382/221 |
| 2019/0297294 A1* | 9/2019 | Goli .................... H04N 5/37452 |

\* cited by examiner

*Primary Examiner* — Stephen P Coleman
(74) *Attorney, Agent, or Firm* — WPAT, P.C.

(57) ABSTRACT

The present disclosure discloses a multi-path image processing apparatus. An image merging circuit is configured to receive image frames that at least one of the image frames has a largest row number, generate redundant pixel row for each of the image frames that has a row number smaller than the largest row number such that the row number of each of the image frames equals to the largest row number, generate redundant pixel columns for each of the image frames having the number thereof determined by a size of a largest operation window, and merge each two of the image frames through the redundant columns thereof to generate a merged image frame. An image processing circuit performs image processing procedure on the merged image frame to generate a processed merged image frame, wherein at least a part of the image processing procedure is operated according to the largest operation window. An image segmentation circuit segments the processed merged image frame to generate processed image frames.

18 Claims, 4 Drawing Sheets

MULTI-PATH IMAGE PROCESSING APPARATUS AND METHOD

BACKGROUND OF THE INVENTION

1. Field of the Invention

The present disclosure relates to a multi-path image processing apparatus and a multi-path image processing method.

2. Description of Related Art

Under the development of image surveillance system, the image resolution of cameras becomes larger and the number of cameras in such system becomes larger as well. Under such a condition, an image signal processing (ISP) chip that is able to process the images from a multiple of image paths faces more design challenges.

For example, the area of the image signal processing chip is determined by the size of the memory for temporary storage of the images and the size of the logic circuit. Higher image resolutions require a larger size of memory to perform storage and the more cameras require a more powerful parallel processing ability of the logic circuit. As a result, if a more efficient image processing technology is absent, the area cost of the image signal processing chip increases a lot.

SUMMARY OF THE INVENTION

In consideration of the problem of the prior art, an object of the present disclosure is to provide a multi-path image processing apparatus and a multi-path image processing method.

The present disclosure discloses a multi-path image processing apparatus that includes an image merging circuit, an image processing circuit and an image segmentation circuit. The image merging circuit is configured for performing the following steps. A plurality of image frames each having a pixel row number and a pixel column number are received, wherein at least one of the image frames has a largest row number. At least one redundant pixel row is generated for each of the image frames that has the pixel row number smaller than the largest row number, such that the pixel row number of each of the image frames having the redundant pixel row equals to the largest row number. At least one redundant pixel column are generated for each two of the image frames under merging, wherein a number of the redundant pixel columns is determined by a size of a largest operation window. Each two of the image frames are merged through the redundant columns thereof to generate a merged image frame. The image processing circuit is configured to perform image processing procedure on the merged image frame to generate a processed merged image frame, wherein at least a part of the image processing procedure is operated according to the largest operation window. The image segmentation circuit is configured to remove the redundant pixel row and the redundant pixel columns of the processed merged image frame so as to segment the processed merged image frame to generate a plurality of processed image frames.

The present disclosure also discloses a multi-path image processing method that includes the steps outlined below. A plurality of image frames each having a pixel row number and a pixel column number are received by an image merging circuit, wherein at least one of the image frames has a largest row number. At least one redundant pixel row is generated for each of the image frames that has the pixel row number smaller than the largest row number by the image merging circuit, such that the pixel row number of each of the image frames having the redundant pixel row equals to the largest row number. At least one redundant pixel column are generated for each two of the image frames under merging by the image merging circuit, wherein a number of the redundant pixel columns is determined by a size of a largest operation window. Each two of the image frames are merged through the redundant columns thereof to generate a merged image frame by the image merging circuit. Image processing procedure is performed on the merged image frame to generate a processed merged image frame by an image processing circuit, wherein at least a part of the image processing procedure is operated according to the largest operation window. The redundant pixel row and the redundant pixel columns of the processed merged image frame are removed so as to segment the processed merged image frame to generate a plurality of processed image frames by an image segmentation circuit.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a multi-path image processing apparatus and a multi-path image processing method to generate redundant pixels for multi-path images. Not only the sizes of the image frames match each other, the image frames are not affected by the pixel values of each other when the image processing based on operation window is performed. The resource of the image processing circuit can thus be shared among different paths of images. The hardware cost of the multi-path image processing apparatus can be greatly reduced.

Figure 1:
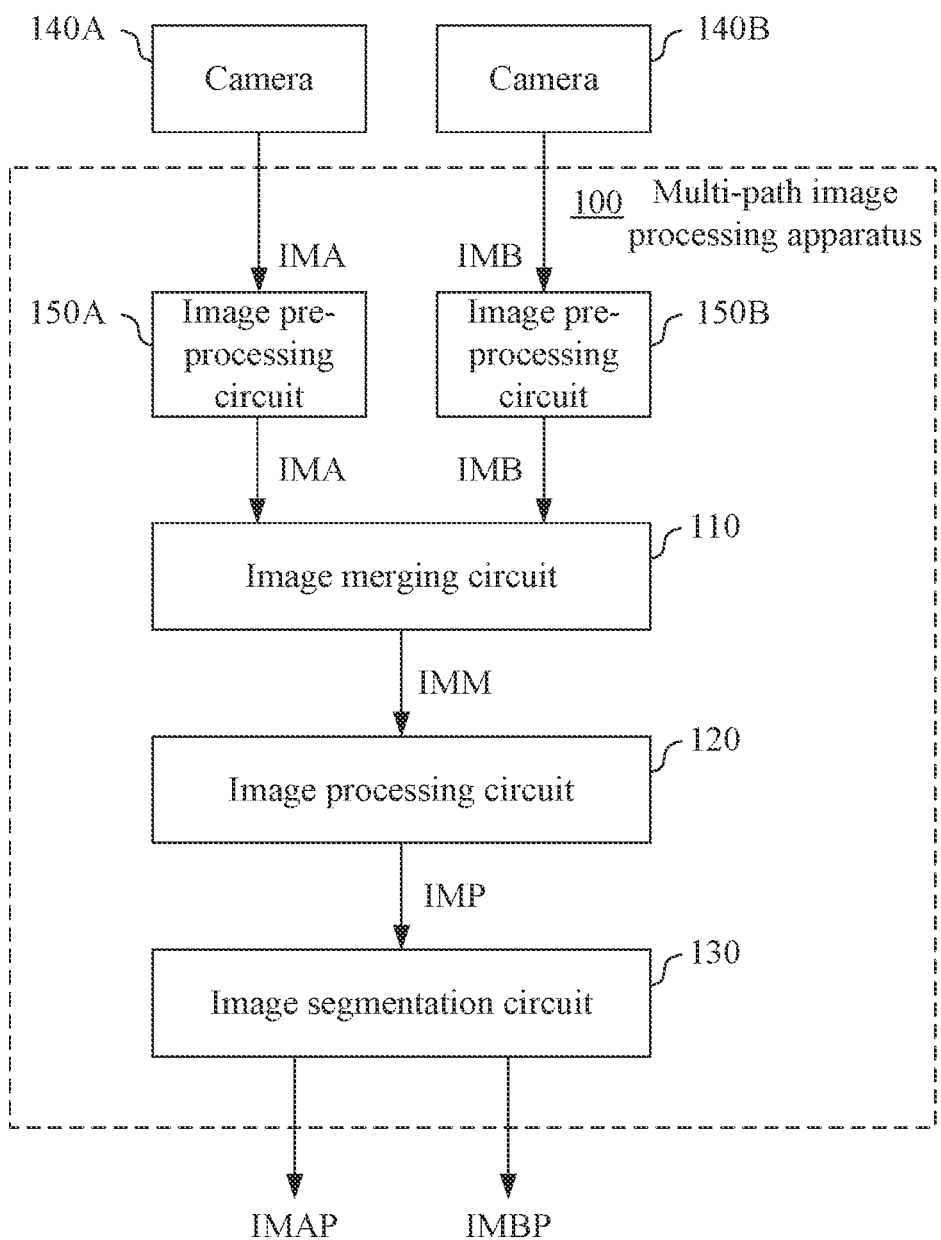
FIG. 1 illustrates a block diagram of a multi-path image processing apparatus according to an embodiment of the present invention.

Reference is now made to FIG. 1. FIG. 1 illustrates a block diagram of a multi-path image processing apparatus 100 according to an embodiment of the present invention. The multi-path image processing apparatus 100 includes an image merging circuit 110, an image processing circuit 120 and an image segmentation circuit 130.

The image merging circuit 110 is configured to receive a plurality of image frames. In an embodiment, different image frames are from a plurality of different cameras.

The image merging circuit 110 merges the image frames and the merged image frames are sent to the image processing circuit 120 for processing such that the multi-path image frames can share the resource of the image processing circuit 120. In an embodiment, in order to accomplish a more efficient resource sharing mechanism, the image processing circuit 120 is configured to perform image processing procedure based on operation windows to perform operation on a multiple of pixels of the image frames at the same time. In an embodiment, the image processing procedure performed based on the operation windows includes time domain noise reduction, edge enhancement, pixel interpolation or a combination thereof.

After the image processing circuit 120 finishes processing the merged image, the image segmentation circuit 130 further segments the processed merged image frames into a plurality of processed image frames each having the sizes identical to the original sizes of the image frames before merging. The image processing can thus be performed under a low hardware cost condition.

The configuration and the operation of the multi-path image processing apparatus 100 are described in detail in the following paragraphs.

In an embodiment, the image merging circuit 110 is configured to receive two image frames IMA and IMB respectively from two cameras 140A and 140B. The multi-path image processing apparatus 100 may further include image pre-processing circuits 150A and 150B to perform image pre-processing procedure respectively on the image frames IMA and IMB. The processed image frames IMA and IMB are received by the image merging circuit 110.

In an embodiment, the image pre-processing procedure performed by the image pre-processing circuit 150A and 150B is to perform operation on individual pixels of the image frames. Comparing to the image processing procedure performed based on operation windows, the workload of the image pre-processing procedure is lower. The image pre-processing procedure may include such as, but not limited to automatic exposure, automatic white balance or a combination thereof.

Reference is now made to FIGS. 2A-2D. FIGS. 2A-2D illustrate different stages of emerging of image frames IMA and IMB performed by the image merging circuit 110 according to an embodiment of the present invention.

Figure 2A:
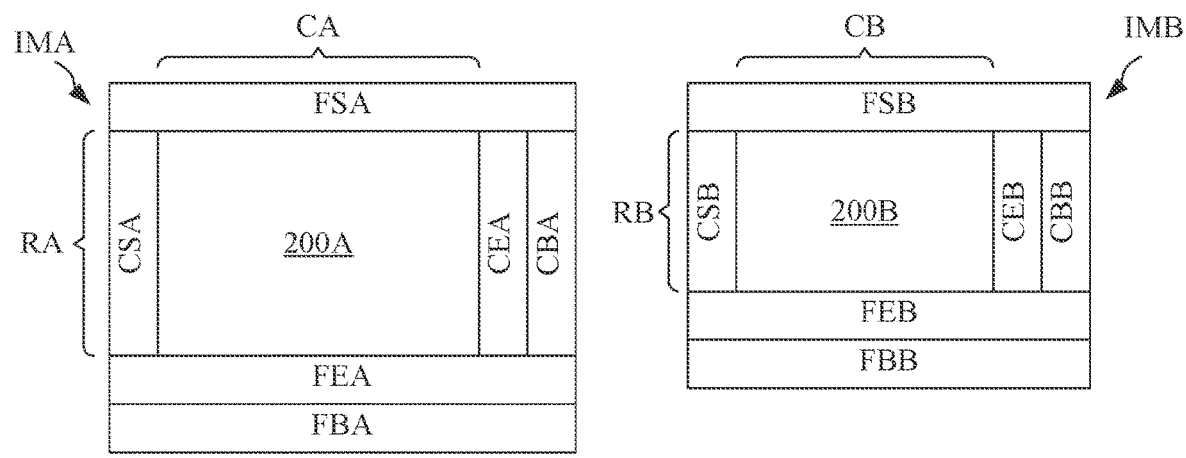
FIGS. 2A-2D illustrate different stages of emerging of image frames performed by the image merging circuit according to an embodiment of the present invention.

As illustrated in FIG. 2A, the image frames IMA and IMB include a plurality of pixels 200A and 200B arranged as a matrix including a plurality of rows and columns. The image frame IMA has a pixel row number RA and a pixel column number CA, and the image frame IMB has a pixel row number RB and a pixel column number CB. At least one of the image frames IMA and IMB has the largest row number.

For example, the pixel row number RA and the pixel column number CA of the image frame IMA are 768 and 1024 respectively. The pixel row number RB and the pixel column number CB of the image frame IMB are 600 and 800 respectively. The pixel row number RA (i.e., 768) of the image frame IMA is larger than the pixel row number RB (i.e., 600) of the image frame IMB. As a result, in this case, the image frame IMA has the largest row number (i.e., 768).

In an embodiment, besides the pixels 200A and 200B, the image frames IMA and IMB further include individual frame synchronization information and individual column synchronization information. The individual frame synchronization information of the image frame IMA includes frame start information FSA, frame end information FEA and frame break information FBA. The individual column synchronization information of the image frame IMA includes column start information CSA, column end information CEA and column break information CBA.

Similarly, the individual frame synchronization information of the image frame IMB includes frame start information FSB, frame end information FEB and frame break information FBB. The individual column synchronization information of the image frame IMB includes column start information CSB, column end information CEB and column break information CBB.

In an embodiment, the image merging circuit 110 can align the image frames IMA and IMB according to the frame start information FSA and FSB of the image frames IMA and IMB.

Subsequently, the image merging circuit 110 is configured to generate at least one redundant pixel row for each of the image frames that has the pixel row number smaller than the largest row number, such that the pixel row number of each of the image frames having the redundant pixel rows eventually equals to the largest row number.

Figure 2B:
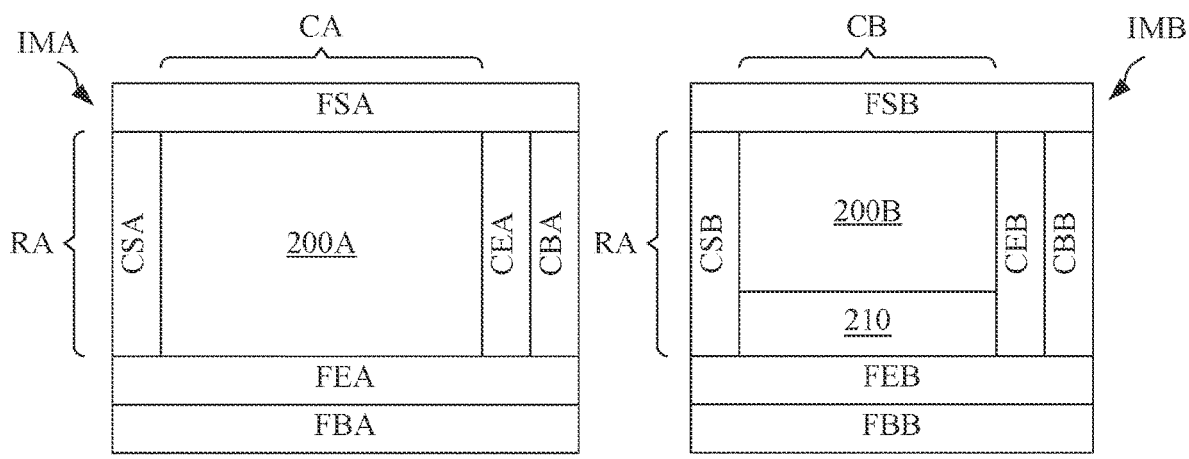

As illustrated in FIG. 2B, since the pixel row number of the image frames IMA is the largest row number, the image merging circuit 110 does not need to generate the redundant pixel row for the image frame IMA. Since the pixel row number of the image frame IMB is smaller than the largest row number, the image merging circuit 110 generates the redundant pixel rows 210 for the image frame IMB.

The number of the redundant pixel rows 210 is determined by a difference between the largest row number (e.g., pixel row number RA) and the original pixel row number (e.g., pixel row number RB) of the image frame IMB. For example, when the largest row number is 768, and the original pixel row number of the image frame IMB is 600, the number of the redundant pixel rows 210 is 168. As a result, after the redundant pixel rows 210 are generated, the pixel row number of each of the image frames IMA and IMB equals to the pixel row number RA.

In an embodiment, the pixel values of the redundant pixel rows 210 are generated by the image merging circuit 110 by duplicating the pixel values of the boundary pixel row of the image frame IMB. For example, when the original pixel row number of the image frame IMB is 600, the pixel values of the redundant pixel rows 210 are duplicated from the pixel values of the 600th pixel row of the image frame IMB.

It is appreciated that in the embodiments described above, the last pixel row of the image frame IMB is used as the boundary pixel row to generate the redundant pixel rows 210. In an embodiment, the first pixel row of the image frame IMB can be selectively used as the boundary pixel row to generate the redundant pixel rows 210. Further, in another embodiment, both of the first pixel row and the last pixel row of the image frame IMB can be selectively used as the boundary pixel row, such that a part of the redundant pixel rows 210 are generated according to the first pixel row while the other part of the redundant pixel rows 210 are generated according to the last pixel row.

Subsequently, the image merging circuit 110 is configured to generate at least one redundant pixel column for each two of the image frames under merging, wherein a number of the redundant pixel column is determined by a size of a largest operation window. In general, the number of the redundant pixel column does not exceed 1% of the total original number of the pixel columns of the image frames. However, the present invention is not limited thereto.

Figure 2C:
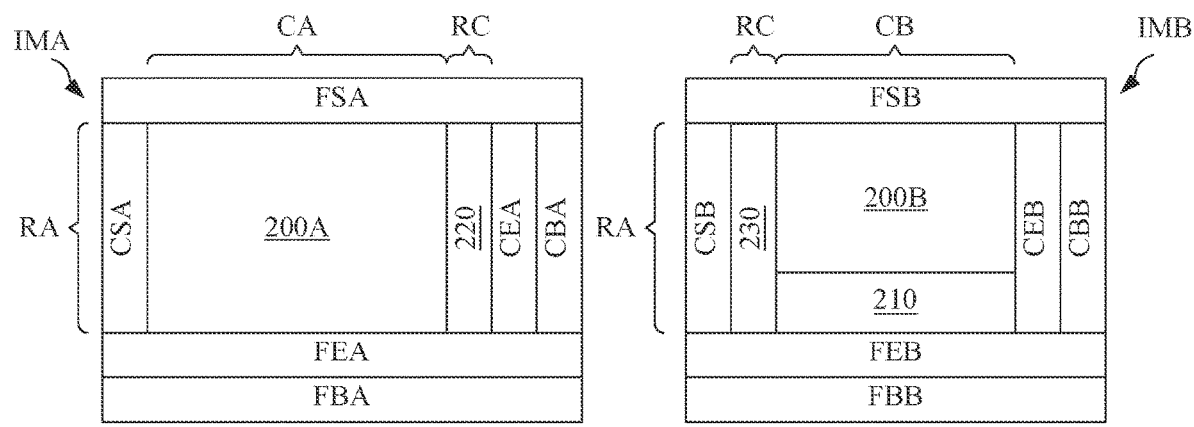

As illustrated in FIG. 2C, the image merging circuit 110 generates the redundant pixel columns 220 and 230 respectively for the image frames IMA and IMB under merging. The numbers of the redundant pixel columns 220 and 230 are respectively a pixel column number RC.

In an embodiment, at least a part of the image processing procedure that the image processing circuit 120 performs is operated according to the largest operation window, wherein the size of the largest operation window is N×N, in which N is an positive odd integer. The number (i.e. the pixel column number RC) of the redundant pixel columns that the image merging circuit 110 generates for the image frames IMA and IMB under merging is (N−1)/2. For example, when N is 7, the image merging circuit 110 generates the redundant pixel column 220 having the number of 3 (i.e., (7−1)/2=3) corresponding to the last pixel column (i.e. the boundary pixel column) for the image frame IMA. At the same time, the image merging circuit 110 generates the redundant pixel column 230 having also the number of 3 corresponding to the first pixel column (i.e. the boundary pixel column) for the image frame IMB.

Similarly, the image merging circuit 110 duplicates the pixel values of the boundary pixel columns of the image frames IMA and IMB to generate the pixel values of the redundant pixel columns 220 and 230. For example, when the original pixel column number of the image frame IMA is 1024, the pixel values of the redundant pixel column 220 are generated by duplicating the pixel values of the 1024th pixel column (i.e., the last pixel column) of the image frame IMA. On the other hand, for the image frame IMB, the pixel values of the redundant pixel column 230 are generated by duplicating the pixel values of the first pixel column of the image frame IMB. However, the pixel values of the redundant pixel columns 220 and 230 may be generated by duplicating other pixels of the image frames IMA and IMB in other embodiments. The present invention is not limited thereto.

According to the redundant pixel columns 220 and 230 generated according to the largest operation window, the image frames IMA and IMB are not affected by the pixel values of each other during the operation of the image processing circuit 120.

Furthermore, the image merging circuit 110 is configured to merge each two of the image frames through the redundant columns thereof such that all the image frames are merged to generate a merged image frame.

Figure 2D:
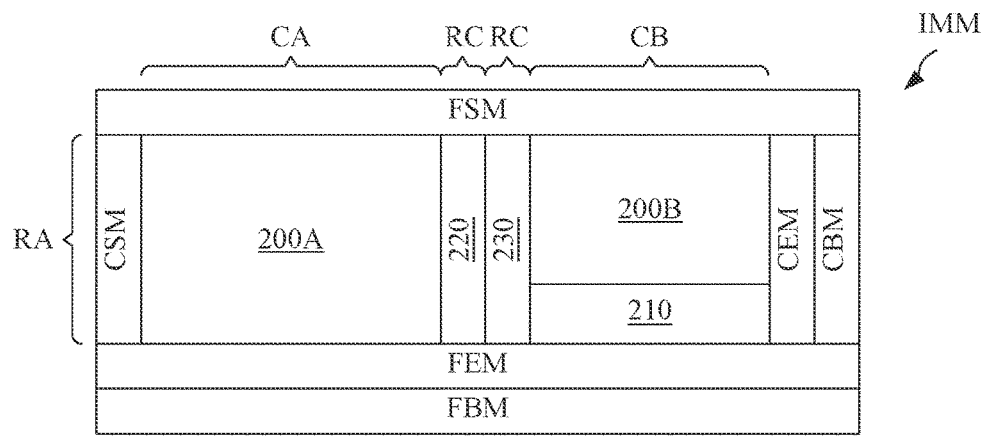

As illustrated in FIG. 2D, the image merging circuit 110 merges the image frames IMA and IMB through the corresponding redundant pixel columns 220 and 230 (the redundant pixel column 220 is concatenated to the redundant pixel column 230), such that the image frames IMA and IMB are merged to generate the merged image frame IMM.

In an embodiment, the image frame IMA has the pixel row number RA and the pixel column number CA in the beginning, and the image frame IMB has the pixel row number RB and the pixel column number CB in the beginning. The largest row number is RA. The number of the redundant pixel columns 220 and 230 generated corresponding to the image frames IMA and IMB are the pixel column number RC. Under such a condition, the pixel row number of the merged image frame IMM is RA (i.e. the largest row number) and the pixel column number of the merged image frame IMM is CA+CB+2×RC.

In an embodiment, the image merging circuit 110 is further configured to remove the individual frame synchronization information and the individual column synchronization information respectively included in the image frames IMA and IMB, and generate merged frame synchronization information and merged column synchronization information of the merged image frame IMM. In an embodiment, the merged frame synchronization information includes frame start information FSM, frame end information FEM and frame break information FBM. The merged column synchronization information includes column start information CSM, column end information CEM and column break information CBM.

The image processing circuit 120 is configured to perform image processing procedure on the merged image frame IMM to generate a processed merged image frame IMP. In an embodiment, the image processing circuit 120 includes such as, but not limited to a memory for temporary storage of the image frame and a logic circuit (not illustrated) for performing image processing operation on the image frame. As described above, the image processing circuit 120 performs the image processing procedure that operates on a multiple of pixels in the image frames at the same time according to an operation window. The detail is not described herein.

The image segmentation circuit 130 is configured to remove the redundant pixel rows (i.e. the redundant pixel rows 210) and the redundant pixel column (i.e. the redundant pixel columns 220 and 230) of the processed merged image frame IMP so as to segment the processed merged image frame IMP to generate a plurality of processed image frames IMAP and IMBP. The pixel row number and the pixel column number of the processed image frames IMAP and IMBP respectively correspond to the pixel row number and the pixel column number of the original image frames IMA and IMB.

In an embodiment, the image segmentation circuit 130 is further configured to re-establish the individual frame synchronization information and the individual column synchronization information for each of the processed image frames IMA and IMB.

As a result, after the image segmentation circuit 130 re-establishes the individual frame synchronization information and the individual column synchronization information, the processed image frame IMAP includes the frame synchronization information including the frame start information FSA, the frame end information FEA and the frame break information FBA, and the individual column synchronization information including the column start information CSA, the column end information CEA and the column break information CBA.

On the other hand, the processed image frame IMBP includes the frame synchronization information including the frame start information FSB, the frame end information FEB and the frame break information FBB, and the individual column synchronization information including the column start information CSB, the column end information CEB and the column break information CBB.

As a result, the multi-path image processing apparatus of the present invention can generate redundant pixels for the multi-path image frames. Not only the sizes of the image frames match each other, the image frames are not affected by the pixel values of each other when the image processing based on operation window is performed. The resource of the image processing circuit can thus be shared among different paths of images. For example, the hardware components, such as but not limited to the memory and the logic unit, included in the image processing circuit, are not necessary disposed for each of different paths of image frames. The hardware cost of the multi-path image processing apparatus can be greatly reduced.

It is appreciated in that the embodiment described above, two image frames (two paths) are used as an example. In practical application, the multi-path image processing apparatus of the present invention can perform merging and processing on the image frames having any number that is larger than two. Further, in the embodiment described above, the order that the redundant pixel rows are generated first and the redundant pixel column are generated subsequently is used as an example. In practical application, the order that the redundant pixel column can be generated first such that the redundant pixel rows are generated subsequently.

Furthermore, in the embodiment described above, the image pixels arranged in the horizontal direction are defined as rows and the image pixels arranged in the vertical direction are defined as columns. In practical application, the image pixels arranged in the vertical direction can be defined as rows and the image pixels arranged in the horizontal direction can be defined as columns.

Figure 3:
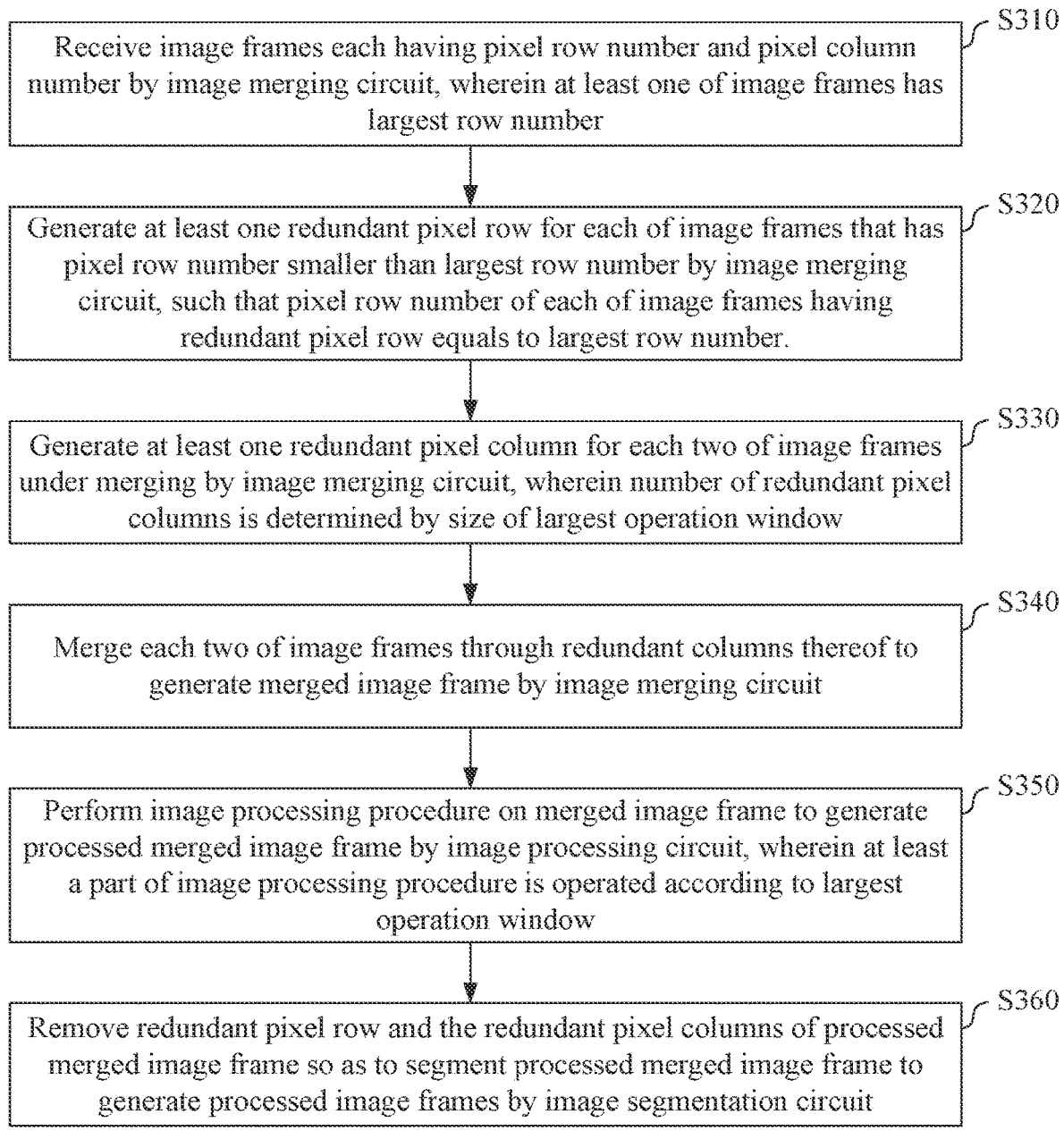
FIG. 3 illustrates a flow chat of a multi-path image processing method according to an embodiment of the present invention.

Reference is now made to FIG. 3. FIG. 3 illustrates a flow chat of a multi-path image processing method 300 according to an embodiment of the present invention.

Besides the device described above, the present invention further provides the multi-path image processing method 300 that can be used in such as, but not limited to the multi-path image processing apparatus 100 in FIG. 1. As illustrated in FIG. 3, an embodiment of the multi-path image processing method 300 includes the following steps.

In step S310, the image frames, e.g. the image frames IMA and IMB illustrated in FIG. 2A, each having the pixel row number and the pixel column number are received by the image merging circuit 110, wherein at least one of the image frames IMA and IMB has the largest row number.

In step S320, at least one redundant pixel row is generated for each of the image frames that has the pixel row number smaller than the largest row number by the image merging circuit 110, such that the pixel row number of each of the image frames having the redundant pixel row equals to the largest row number.

Taking the image frames IMA and IMB illustrated in FIG. 2B as an example, the image merging circuit 110 generates the redundant pixel rows 210 for the image frame IMB such that the pixel row number of each of the image frames IMA and IMB equals to the largest row number.

In step S330, at least one redundant pixel column is generated for each two of the image frames under merging by the image merging circuit 110, wherein the number of the redundant pixel columns is determined by the size of the largest operation window.

Taking the image frames IMA and IMB illustrated in FIG. 2C as an example, the image merging circuit 110 generates the redundant pixel columns 220 and 230 respectively for the image frames IMA and IMB. The number of the redundant pixel columns 220 and 230 are determined by the size of the largest operation window of the image processing circuit 120.

In step S340, each two of the image frames are merged through the redundant columns thereof to generate the merged image frame by the image merging circuit 110.

Taking the merged image frame IMM illustrated in FIG. 2D as an example, the image merging circuit 110 merges the image frames IMA and IMB through the corresponding redundant pixel columns 220 and 230 to generate the merged image frame IMM.

In step S350, the image processing procedure is performed on the merged image frame, e.g. the merged image frame IMM illustrated in FIG. 2D, to generate the processed merged image frame IMP by the image processing circuit 120, wherein at least a part of the image processing procedure is operated according to the largest operation window.

In step S360, the redundant pixel rows and the redundant pixel columns of the processed merged image frame IMP are removed so as to segment the processed merged image frame IMP to generate a plurality of processed image frames, e.g. the processed image frames IMAP and IMBP by the image segmentation circuit 130.

It is appreciated that the embodiments described above are merely an example. In other embodiments, it should be appreciated that many modifications and changes may be made by those of ordinary skill in the art without departing, from the spirit of the invention.

In summary, the multi-path image processing apparatus and the multi-path image processing method of the present invention generate redundant pixels for multi-path images. Not only the sizes of the image frames match each other, the image frames are not affected by the pixel values of each other when the image processing based on operation window is performed. The resource of the image processing circuit can thus be shared among different paths of images. The hardware cost of the multi-path image processing apparatus can be greatly reduced.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A multi-path image processing apparatus, comprising:
    an image merging circuit configured for:
        receiving a plurality of image frames each having a pixel row number and a pixel column number, wherein at least one of the image frames has a largest row number;
        generating at least one redundant pixel row for each of the image frames that has the pixel row number smaller than the largest row number, such that the pixel row number of each of the image frames having the redundant pixel row equals to the largest row number;
        generating at least one redundant pixel column for each two of the image frames under merging, wherein a number of the redundant pixel columns is determined by a size of a largest operation window; and
        merging each two of the image frames through the redundant columns thereof to generate a merged image frame;
    an image processing circuit configured to perform image processing procedure on the merged image frame to generate a processed merged image frame, wherein at least a part of the image processing procedure is operated according to the largest operation window; and
    an image segmentation circuit configured to remove the redundant pixel row and the redundant pixel columns of the processed merged image frame so as to segment the processed merged image frame to generate a plurality of processed image frames.

2. The multi-path image processing apparatus of claim 1, wherein the image merging circuit is configured to duplicate a plurality of pixel values of at least one boundary pixel row and at least one boundary pixel column of the image frames to respectively generate the redundant pixel row and the redundant pixel columns.

3. The multi-path image processing apparatus of claim 1, wherein the image processing procedure comprises time domain noise reduction, edge enhancement, pixel interpolation or a combination thereof.

4. The multi-path image processing apparatus of claim 1, wherein the image frames are from one of a plurality of cameras.

5. The multi-path image processing apparatus of claim 1, wherein the size of the largest operation window is N×N, in which N is an positive odd integer, and the number of the redundant pixel columns that the image merging circuit generates for each two of the image frames under merging is (N−1)/2.

6. The multi-path image processing apparatus of claim 1, wherein the image merging circuit is further configured to remove individual frame synchronization information and individual column synchronization information comprised by the image frames to generate merged frame synchronization information and merged column synchronization information for the merged image frame; and
the image segmentation circuit is further configured to re-establish the individual frame synchronization information and the individual column synchronization information for each of the processed image frames.

7. The multi-path image processing apparatus of claim 6, wherein the image merging circuit is configured to align the image frames according to frame start information of the individual frame synchronization information comprised by each of the image frames.

8. The multi-path image processing apparatus of claim 1, further comprising a plurality of image pre-processing circuit to perform image pre-processing procedure one each of the image frames so as to be received by the image merging circuit.

9. The multi-path image processing apparatus of claim 8, wherein the image pre-processing procedure comprises automatic exposure, automatic white balance or a combination thereof.

10. A multi-path image processing method comprising:
receiving a plurality of image frames each having a pixel row number and a pixel column number by an image merging circuit, wherein at least one of the image frames has a largest row number;
generating at least one redundant pixel row for each of the image frames that has the pixel row number smaller than the largest row number by the image merging circuit, such that the pixel row number of each of the image frames having the redundant pixel row equals to the largest row number;
generating at least one redundant pixel column for each two of the image frames under merging by the image merging circuit, wherein a number of the redundant pixel columns is determined by a size of a largest operation window;
merging each two of the image frames through the redundant columns thereof to generate a merged image frame by the image merging circuit;
performing image processing procedure on the merged image frame to generate a processed merged image frame by an image processing circuit, wherein at least a part of the image processing procedure is operated according to the largest operation window; and
removing the redundant pixel row and the redundant pixel columns of the processed merged image frame so as to segment the processed merged image frame to generate a plurality of processed image frames by an image segmentation circuit.

11. The multi-path image processing method of claim 10, further comprising:
duplicating a plurality of pixel values of at least one boundary pixel row and at least one boundary pixel column of the image frames to respectively generate the redundant pixel row and the redundant pixel columns by the image merging circuit.

12. The multi-path image processing method of claim 10, wherein the image processing procedure comprises time domain noise reduction, edge enhancement, pixel interpolation or a combination thereof.

13. The multi-path image processing method of claim 10, wherein the image frames are from one of a plurality of cameras.

14. The multi-path image processing method of claim 10, wherein the size of the largest operation window is N×N, in which N is an positive odd integer, and the number of the redundant pixel columns that the image merging circuit generates for each two of the image frames under merging is (N−1)/2.

15. The multi-path image processing method of claim 10, further comprising:
removing individual frame synchronization information and individual column synchronization information comprised by the image frames to generate merged frame synchronization information and merged column synchronization information for the merged image frame by the image merging circuit;
re-establishing the individual frame synchronization information and the individual column synchronization information for each of the processed image frames by the image segmentation circuit.

16. The multi-path image processing method of claim 15, further comprising:
aligning the image frames according to frame start information of the individual frame synchronization information comprised by each of the image frames by the image merging circuit.

17. The multi-path image processing method of claim 10, further comprising:
performing image pre-processing procedure one each of the image frames so as to be received by the image merging circuit by a plurality of image pre-processing circuit.

18. The multi-path image processing method of claim 17, wherein the image pre-processing procedure comprises automatic exposure, automatic white balance or a combination thereof.

* * * * *